US006674852B1

(12) United States Patent
Hamilton

(10) Patent No.: US 6,674,852 B1
(45) Date of Patent: Jan. 6, 2004

(54) CALL MANAGEMENT IMPLEMENTED USING CALL ROUTING ENGINE

(75) Inventor: Thomas Hamilton, Marlborough, MA (US)

(73) Assignee: Cisco Technology, Inc., San Jose, CA (US)

( * ) Notice: Subject to any disclaimer, the term of this patent is extended or adjusted under 35 U.S.C. 154(b) by 607 days.

(21) Appl. No.: 09/652,346

(22) Filed: Aug. 31, 2000

(51) Int. Cl.[7] .................. H04M 3/00; H04M 3/523; H04M 7/00
(52) U.S. Cl. ................ 379/221.14; 379/265.02; 379/289
(58) Field of Search ............. 379/219, 220.01, 379/221.02, 221.06, 221.14, 265.01, 265.02, 289

(56) References Cited

U.S. PATENT DOCUMENTS

| 5,828,741 | A | * | 10/1998 | Han .......................... 379/157 |
| 6,044,144 | A | * | 3/2000 | Becker et al. ......... 379/265.02 |
| 6,070,142 | A | * | 5/2000 | McDonough et al. .......... 705/7 |
| 6,115,693 | A | * | 9/2000 | McDonough et al. ......... 705/10 |
| 6,134,530 | A | * | 10/2000 | Bunting et al. ................. 705/7 |
| 6,205,211 | B1 | * | 3/2001 | Thomas et al. ......... 379/114.06 |
| 6,330,316 | B1 | * | 12/2001 | Donak et al. ............... 379/196 |
| 6,426,955 | B1 | * | 7/2002 | Gossett Dalton et al. ... 370/401 |
| 6,487,283 | B2 | * | 11/2002 | Thomas et al. ........ 379/112.01 |

OTHER PUBLICATIONS

"Software License, Hardware Purchase and Technical Support Agreement", entered into by GeoTel Communications Corporation, a predecessor in interest to the current Assignee of the subject application, and Putnam Investments, Inc. of Boston, MA. 1998.

Slides entitled "Desklink Overview" dated Dec. 2, 1998, were used in an oral presentation made to a prospective customer of GeoTel on Dec. 2, 1998.

* cited by examiner

Primary Examiner—Harry S. Hong
(74) Attorney, Agent, or Firm—Cesari and McKenna, LLP

(57) ABSTRACT

A call management technique implemented using a call routing engine is disclosed. The technique of the present invention may be used to advantage to implement dialed number translation techniques.

40 Claims, 8 Drawing Sheets

CALL MANAGEMENT IMPLEMENTED USING CALL ROUTING ENGINE

CROSS-REFERENCE TO RELATED APPLICATIONS

This application is related to copending U.S. patent application Ser. No. 09/652,335 entitled "Associating Call Appearance With Data Associated With Call," and to copending U.S. patent application Ser. No. 09/652,445, entitled "Fault Tolerant Telephony Control." Each of these copending applications is being filed concurrently with the subject application, is assigned to the Assignee of the subject application, and is hereby incorporated herein by reference in its entirety.

BACKGROUND OF THE INVENTION

1. Field of the Invention

The present invention relates generally to call management using a routing engine in a communications system, and more specifically, to a call management technique that may be used to facilitate implementation of dialed number translation techniques.

2. Brief Description of Related Prior Art

Systems for managing and routing calls through public and/or private communications networks are known in the art. Conventional automatic call distribution (ACD) systems route calls to agents in telemarketing and service inquiry centers, and provide limited real-time call management and reporting capabilities. A typical ACD system will monitor the status of the agent and, when an incoming call is received, selects the agent to handle a particular service request. Reporting and performance data from the agents are also generated by the ACD.

One particular type of scheme for distributing calls to agents is disclosed in Frauenthal et al., U.S. Pat. No. 4,737,983. According to Frauenthal et al., data representing the present call congestion of each of the ACD systems is accumulated in a data base. Using the data in the data base, the percentage of calls made to the ACD systems, as a group, is determined. The information is then used to generate call routing information. When a new call is made to the central office, the routing information is queried to determine which of the ACD systems is to receive the call, so as to balance the call traffic load across the ACD systems.

Another call management and distribution scheme is provided in Gechter et al., U.S. Pat. No. 5,036,535. This patent discloses a system for automatically distributing telephone calls placed over a network to one of a plurality of agent stations connected to the network via service interfaces, and providing status messages to the network. Gechter et al.'s disclosed system includes means for receiving the agent status messages and call arrival messages from the network, which means are connected via a network service interface to the network. Routing means responsive to the receiving means is provided for generating a routing signal provided to the network to connect the incoming call to an agent station through the network. In the system disclosed in Gechter et al., when an incoming call is made to the call router, it decides which agent station should receive the call, establishes a call with that agent station, and then transfers the original call onto the second call to connect the incoming caller directly to the agent station and then drops out of the connection (See, Gechter et al., column 11, lines 45–51).

Other prior art call management, routing, and distribution techniques are disclosed in Andrews et al., U.S. Pat. No. 5,873,130, which is assigned to the assignee of the subject application. This patent discloses a communications system and method for automatically making telephone routing decisions with global authority based upon information gathered in real time from the entire communications system and global optimization criteria. The entirety of the disclosure of the Andrews et al. patent is incorporated herein by reference.

Conventional communications systems of the type disclosed in the aforesaid Andrews et al. patent typically comprise one or more ACD systems connected to each other via at least one public switched telephone network (PSTN). The ACD systems and the PSTN may be controlled by a central controller so as to route calls to and from agents (and/or caller services, such as interactive voice response units) associated with such systems, and callers external thereto, through the ACD systems and PSTN.

It is not uncommon for each such ACD system to implement "dialed plans" or "dialed number translation" techniques (hereinafter collectively or singly referred to as "dialed number plans"). In such conventional dialed number plans, a number dialed by an agent, or an alphanumeric string entered by the agent via a computer telephony-integration (CTI) agent workstation may be used to request the establishment of an outbound call. The dialed number or entered string may be compared to preconfigured dialed number and alphanumeric string entries in dialed number plan translation tables (DNPTT) stored in the ACD system. If the dialed number and/or entered alphanumeric string matches one of these preconfigured entries, the ACD system determines from an associated entry in the DNPTT a predetermined conversion or translation algorithm that is to be applied to the dialed number to convert or translate the dialed number into an actual destination telephone number for being supplied to the PSTN to establish the call via the PSTN. Such conversion/translation algorithms are hereinafter and/or singly termed "conversion algorithms".

Such conversion algorithms may be used to implement certain dialing conveniences or features (e.g., "speed dialing" features whereby a dialed extension number is converted into a telephone number that may be validly supplied to the PSTN to initiate an outbound call), and may involve, e.g., pre-pending one or more predetermined digits to the beginning of a dialed number so as to cause the resulting numerical string to include all necessary outside dialing, long distance, and area code prefixes. Other such conventional algorithms may convert a logical name or handle (e.g., the handle "sales") entered by an agent via a CTI agent workstation into a telephone number associated with the entered name or handle in the dialed number plan tables (e.g., a telephone number that may be validly supplied to the PSTN to initiate the establishment by the PSTN of a call to a corporate sales department). The DNPTT may also include other entries that indicate e.g., whether a given agent is authorized to request the type of outbound call (e.g., an interational long distance, national long distance, etc. call) that will be initiated if the actual valid telephone number generated by the conversion algorithms is provided to the PSTN.

Unfortunately, in these conventional ACD-implemented dialed number plans, each of the individual ACD systems maintains its own respective DNPTT and implements its own respective dialed number plan; no mechanism is provided that permits the implementation of a truly global (i.e., communication system- or enterprise-wide) dialed number plan (i.e., based upon a truly global dialed number plan and DNPTT). Disadvantageously, this decreases the efficiency and utility of the communication system.

Also unfortunately, the conventional conversion algorithms that are applied to the dialed numbers and agent-entered strings to convert them to valid PSTN destination telephone numbers are preconfigured in the respective DNPTT of the ACD systems and do not change dynamically based upon real-time conditions (e.g., the availability and configuration of telecommunication resources) in the communication system. This is also disadvantageous, since such conditions in the communications system may change quite rapidly, and therefore, such static preconfiguring of the conversion algorithms may reduce the efficiency of the communication system.

Additionally, conventional ACD systems typically are complex telecommunications devices and costly to acquire; thus, the use of conventional ACD systems in such conventional dialed number plans inherently increases the cost and complexity of implementing such plans. Accordingly, it would be desirable to reduce or eliminate the need to use conventional ACD systems in implementing dialed number plans.

Furthermore, the use of Internet Protocol (IP) telephony to carry voice telephone traffic offers cost advantages over the use of Plain Old Telephone Service (POTS) telephony to carry such traffic, as in contradistinction to POTS telephony, an IP network may be used to carry both voice and data traffic over a single network connection. Additionally, the widespread and increasing availability of IP broadband service is making use of IP telephony even more attractive. Accordingly, it would be desirable to provide means for facilitating use of IP telephony services in the communication system.

SUMMARY OF THE INVENTION

According to the present invention, a call management technique is provided that overcomes the aforesaid and other disadvantages and drawbacks of the prior art. More specifically, in the present invention, a call management technique is provided that is implemented using a call routing engine. In one embodiment of the technique, the engine receives a call management request from a first device that requests that the engine provide the first device with a destination label of a second device that is desired to be called by the first device via a network (e.g., a private network or a public network, such as a PSTN). The second device is identified in the request by a first value. The label is determined by the engine based, at least in part, upon information correlating the label, the first value and a second value associated with the second device. At least the label and the second value, but optionally also the first value, may be associated by the engine with the second device (e.g., as associated entries in a novel type of global DNPTT) during a log-in negotiation between the engine and the second device. After being determined by the engine, the label may be provided to the first device; the first device may then use the label to initiate establishment of a call from the first device to the second device via the network.

If the network is a PSTN, the label may be a telephone number that may be validly supplied to a PSTN by the first device to cause the PSTN to initiate the establishment of the call via the PSTN from the first device to a call destination associated with or specified by the number (e.g., the second device). The first value may be an agent-dialed number or agent-entered alphanumeric string that specifies an agent or agent workgroup (e.g., an agent skillgroup). The second value may be, comprise, or specify a value (e.g., a physical address) uniquely associated with the second device.

Either or both of the first and second devices may comprise a respective agent system (e.g., an ACD and/or CTI agent workstation). Alternatively, the first device may comprise an agent system and the second device may comprise a voice response unit.

If the first and second devices are agent systems, neither the first device nor the second device need comprise, or be part of, a conventional ACD system. Instead, either or both of the first device and the second device may comprise, or be part of, a respective non-ACD system that is capable of providing ACD-like features. Each such non-ACD system may comprise a plurality of distributed computer processes executing in conventional computer systems networked together via conventional computer networking hardware and software and provisioned with appropriate telephony hardware and software. These computer systems may include one or more CTI agent workstations.

In order to become part of the communications system controlled by the routing engine, CTI agent workstation's comprised in these non-ACD system may undergo initial log-in negotiations that involve the routing engine. It may be during such negotiation that the first value, second value, and label may be associated with the second device by the engine. Advantageously, by exchanging such information and associating same with the second device during such negotiation, an efficient mechanism is provided by which changes in the configuration of the communication system that may result from changes in the destination label and/or physical address of the second device associated with a given agent may be easily determined and accommodated by the routing engine (e.g., the engine may easily update global configuration data of the system to reflect such changes.

The engine may dynamically select the label that is provided to the first device based upon real-time conditions of a communications system (i.e., comprising the network and the first and second devices) controlled by the engine. For example, the engine may select call control script commands to be executed based upon the first value. These script commands, when executed by the engine, may cause the engine to dynamically select algorithms to be used to select the label to be provided to the first device from a plurality of destination labels of, or associated with, respective devices in a particular classification (e.g., devices associated with agents belonging to a particular agent workgroup), based upon selection parameters embodied in the script. These parameters may utilize real-time information concerning the condition of telecommunication resources in the communications system, such as, which of the respective devices is currently available to receive and process a call from the first device, and the current global configuration of the communication system.

The public network may be an IP-based network (e.g., the Internet). The network may be an IP network that may be used to establish an IP telephony call.

These features of the present invention provide a mechanism that permits the implementation of a truly global dialed number plan, wherein the algorithms and destination labels provided by such a plan may be dynamically selected based upon the real-time condition of the communication system in which the plan is implemented. Also, the technique of the present invention need not be implemented using conventional ACD systems. Thus, advantageously, dialed number plans and communication systems implemented using the present invention may be more efficient, less expensive and less complex compared to the prior art. Further advantageously, the implementation of such plans and systems may be easier according to the present invention compared to the prior art. Yet further advantageously, means are provided in one embodiment of the present invention for facilitating use of IP telephony services.

It will be appreciated by those skilled in the art that although the following Detailed Description will proceed with reference being made to illustrative embodiments and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

Other features and advantages of the present invention will become apparent as the following Detailed Description proceeds, and upon reference to the Drawings, wherein like numerals depict like parts, and wherein.

DETAILED DESCRIPTION OF ILLUSTRATIVE EMBODIMENTS

Figure 1:
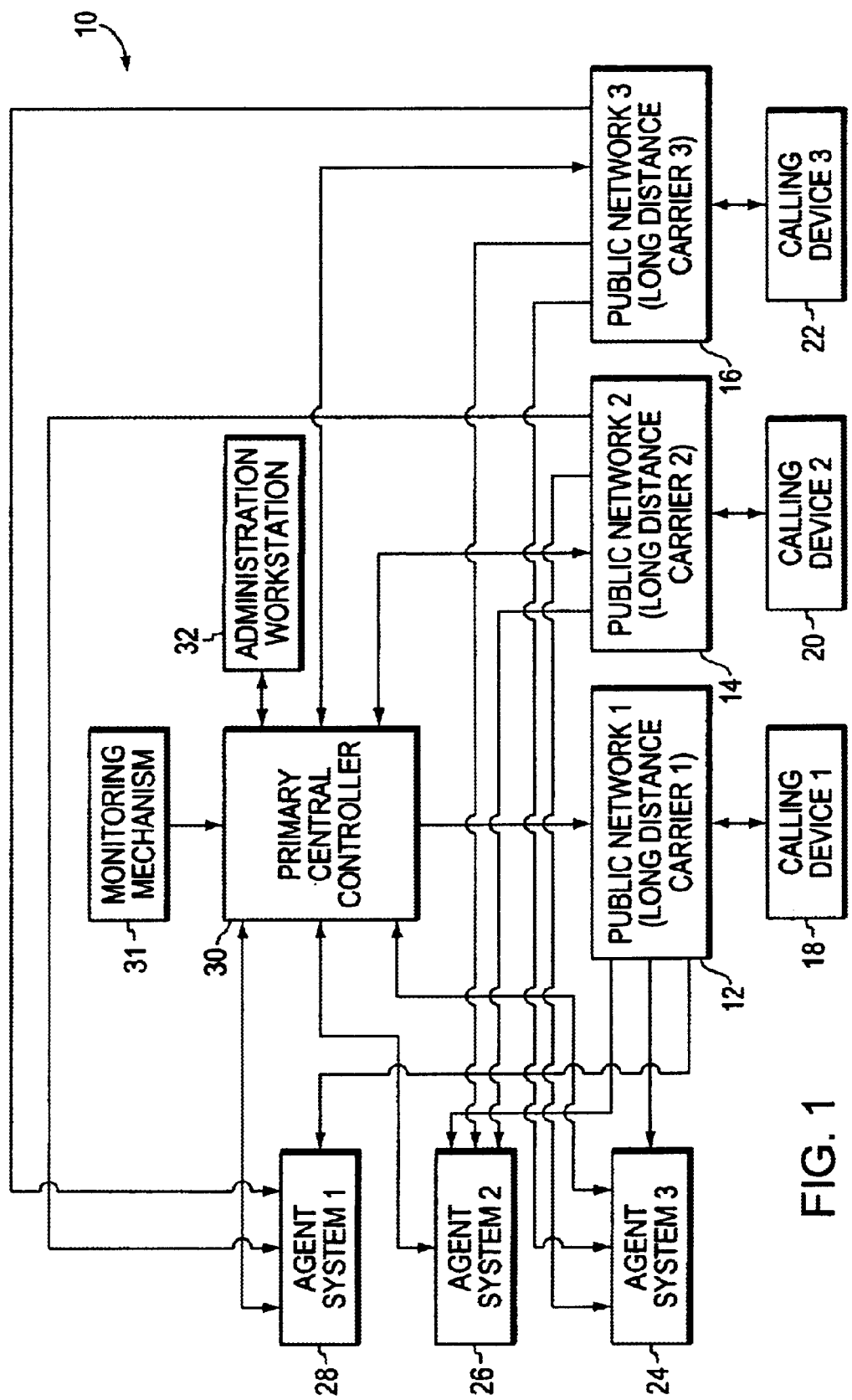
FIG. 1 is a functional block diagram of one embodiment of a communications system wherein the present invention may be practiced to advantage.

FIG. 1 is an architectural-level block diagram illustrating functional components of a communications system 10 wherein the present invention may be practiced. System 10 includes a plurality of agent systems 24, 26, 28 connected to a primary central controller 30 and a plurality of public telephone and/or long distance carrier networks (e.g., British Telecom, Energis, France Telecom, Cable and Wireless, MCI, Sprint, AT&T) 12, 14, 16. Calling devices 18, 20, 22 place calls to called devices (i.e., agent systems 24, 26, 28) via public networks 12, 14, 16. As will be explained more fully below, primary central controller 30 generates command messages for controlling routing and distribution of calls through the long distance carriers to and from the agent systems, and through the agent systems themselves to and from individual workgroups, agents and/or caller services, based upon requested service messages (e.g., telephone numbers and/or other information and messages supplied from the calling devices and public networks, and/or call management request messages from the called devices), status messages (i.e., availability of resources for use by callers, loading of system resources, etc.) supplied by the agent systems, and user-generated call routing control scripts) stored in controller 30. Administration workstation 32 permits user access and control of the system 10 by, for example, permitting generation and modification of system configuration data, call routing scripts, etc. stored in controller 30. Monitoring and diagnostic mechanism 31 monitors the various elements of the system (i.e., the agent systems 24, 26, 28, administration means 32, etc.) to determine whether these elements are functioning properly. If a malfunction is detected, that fact is signaled to the central controller 30, so that it can undertake appropriate action to correct and/or eliminate the malfunction and/or any resulting problems to the system 10 from the malfunction.

Although not shown in the Figures, each of the conventional long distance carriers 12, 14, 16 includes a long distance control network (e.g., AT&T's Signaling System 7 (SS7) control network, MCI's TCP/IP-based control network, Sprint's X.25-based control network and/or foreign telecommunication's CCITT SS7-based control network) and local exchange carriers. The long distance control networks control routing of calls through the long distance network serviced by the exchange carriers. When a long distance call request is initially received by the exchange carrier, from a calling device (e.g., a caller at a calling device dials a long distance telephone number) it forwards the call request to the long distance network, which routes the call to its intended destination. In system 10, when the long distance control network receives a request for long distance connection to one of the agents in the agent systems' workgroups or caller services, the long distance control network forwards the long distance routing request to the central controller 30. As will be described more fully below, central controller 30 then processes the request and controls the system 10 to route the call to a destination in accordance with call routing control scripts executed by the controller 30. The system 10 accomplishes call routing by, inter alia, translating the routing request message into a route response or command message that addresses the desired destination. System 10 also supports routing of calls across local exchange carriers and international PTT's by utilizing substantially the same call control and distribution techniques discussed above.

As is known to those skilled in the art, call destinations are commonly termed "labels." A "label" may be or specify, e.g., a particular destination telephone number.

Figure 2:
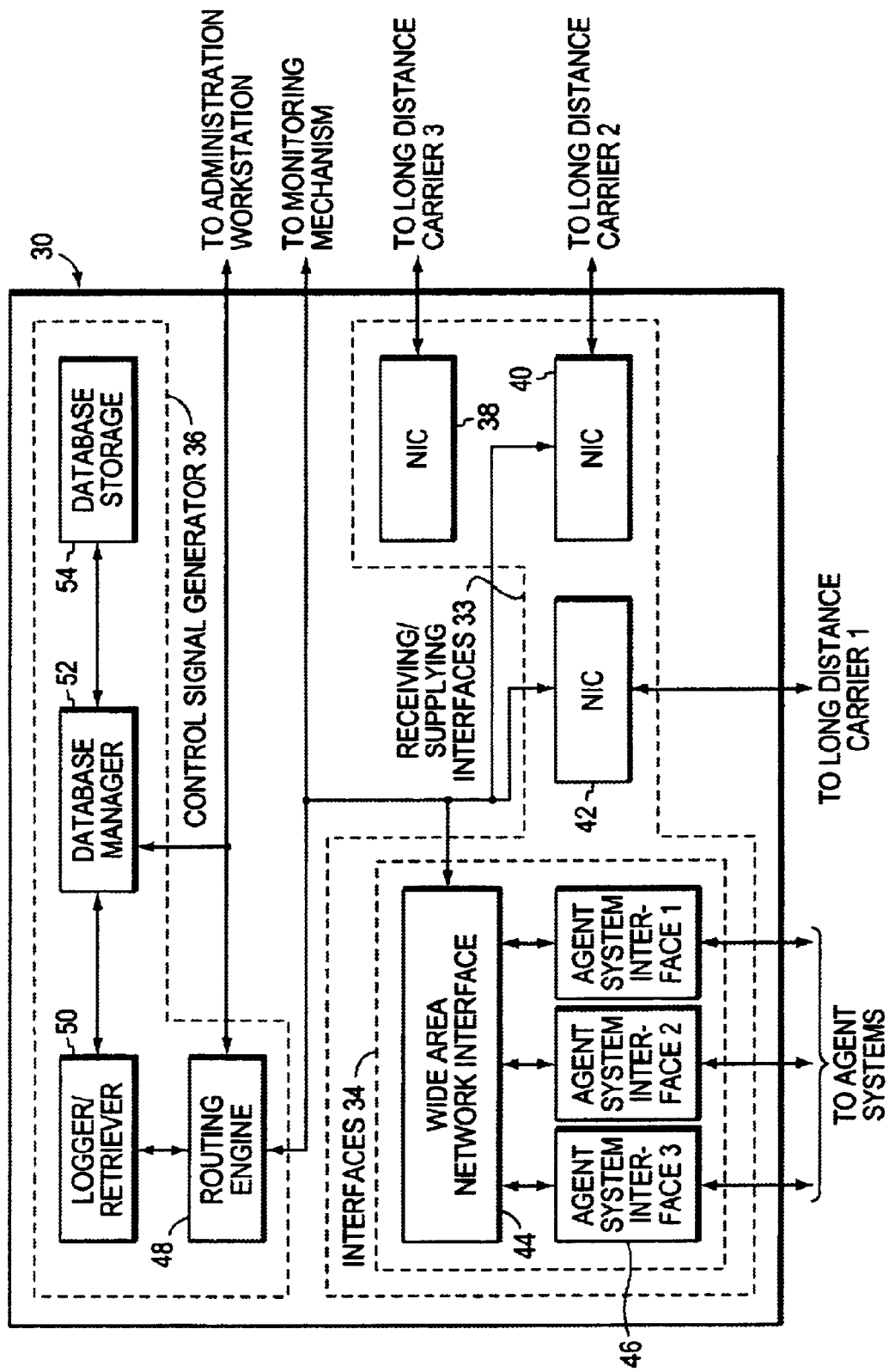
FIG. 2 is a functional block diagram of the primary central controller of the system of FIG. 1.

FIG. 2 is a schematic block diagram illustrating functional components of the central controller 30. Controller 30 includes interfaces 33 for receiving status and requested service messages, and for supplying command messages generating by the controller 30 to the public networks and the agent systems. Interfaces 33 include long distance carrier network interface controllers (NICs) 38, 40, 42 that interface the controller 30 to the public networks 12, 14, 16, respectively. Each of the NICs 38, 40, 42 is appropriately constructed to permit transmission of command messages to and receipt of requested service and other messages from the respective network to which it is connected. For example, if NIC 42 is connected to an AT&T network, then it is appropriately constructed to permit transfer of command and requested service messages between the controller 30 and the SS7 network; additionally, the NIC 42 may be constructed to receive and process from the SS7 network confirmation messages that confirm that command messages provided to the SS7 are proper for the SS7 network and have or are being acted upon by the SS7 network. Other types of carriers must also be similarly accommodated by appropriately constructing the other NICs 40, 38 to permit exchange of such messages between these networks and the controller 30.

Interfaces 33 also include agent interfaces 34 for interfacing the controller 30 to the agent systems 24, 26, 28. Interfaces 34 include agent system interfaces 46 connected to a conventional wide area network interface 44 which connects the controller 30 to the interfaces 34 so as to permit transmission of status and other messages from the agent systems to the routing engine 48, and to permit transmission of command and other messages to the agent systems 24, 26, 28. It should be understood that the particular types of interfaces 46 used will depend upon the particular constructions of the agent systems, the wide area network (not shown) that connects the controller to the agent systems, and the controller itself. Interface 44 may be adapted for use with a conventional TCP/IP (Transmission Control Protocol/ Internet Protocol) network (not shown, which connects the controller to the agent systems), although alternatively, interface 44 may be constructed for use with networks that use other network protocols.

Figure 5:
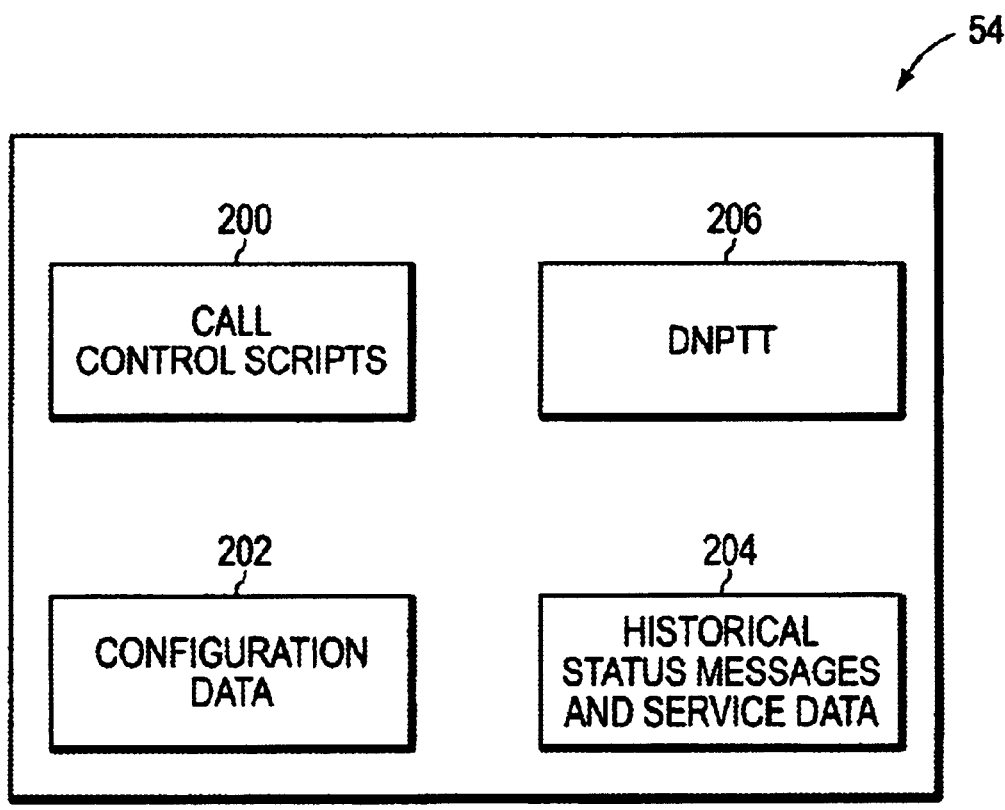
FIG. 5 is a schematic block diagram illustrating data structures in the database shown in FIG. 4.

Control signal generator 36 is connected to the interfaces 33, monitoring mechanism 31, and administrative workstation 32. Control signal generator 36 comprises routing engine 48, database logger/retrieving engine 50, database manager 52, and database 54. Routing engine 48 determines how to route calls in the system 10 (i.e., through the public networks to the agent systems, and in the agent systems themselves), and transmits this routing information (e.g., in the form of appropriate command messages) that address the desired end-termination (e.g., an agent station or computer-telephony (CTI) workstation in a workgroup or a caller service in the system) to interfaces 33, 34 for transmission to the agent systems and long distance control networks, respectively. In order to determine how to route calls in the system, routing engine 48 may take into consideration, among other things, real-time requested service messages supplied to it by the interfaces 33, system configuration data 202 (see FIG. 5) and historical (i.e., previously stored) requested service data derived from requested service messages and status messages 204 retrieved by logger/retriever 50 at the command of the routing engine 48 from the system's historical database (comprising database manager 52 and storage mechanism 54), real-time status messages from the agent systems supplied to it from the interfaces 34, information from the monitoring mechanism 31 concerning what components (if any) of the system are currently unavailable because they are malfunctioning or inoperative, and routing optimization criteria and/or rules and commands in the form of call routing control scripts 200 generated by the administration workstation and stored in database 54. Routine engine 48 uses this data to determine the manner in which to route calls in the system. After making its decision on how best to route a particular call, generating appropriate command messages to implement this decision, and transmitting the command messages to the interfaces 33 and 34, routing engine 48 instructs logging engine 50 to store the real-time information presented above in the database 54 for use in determining how to route later calls. Logging engine 50 in turn, commands database manager 52 to store this information in database 54.

Figure 3:
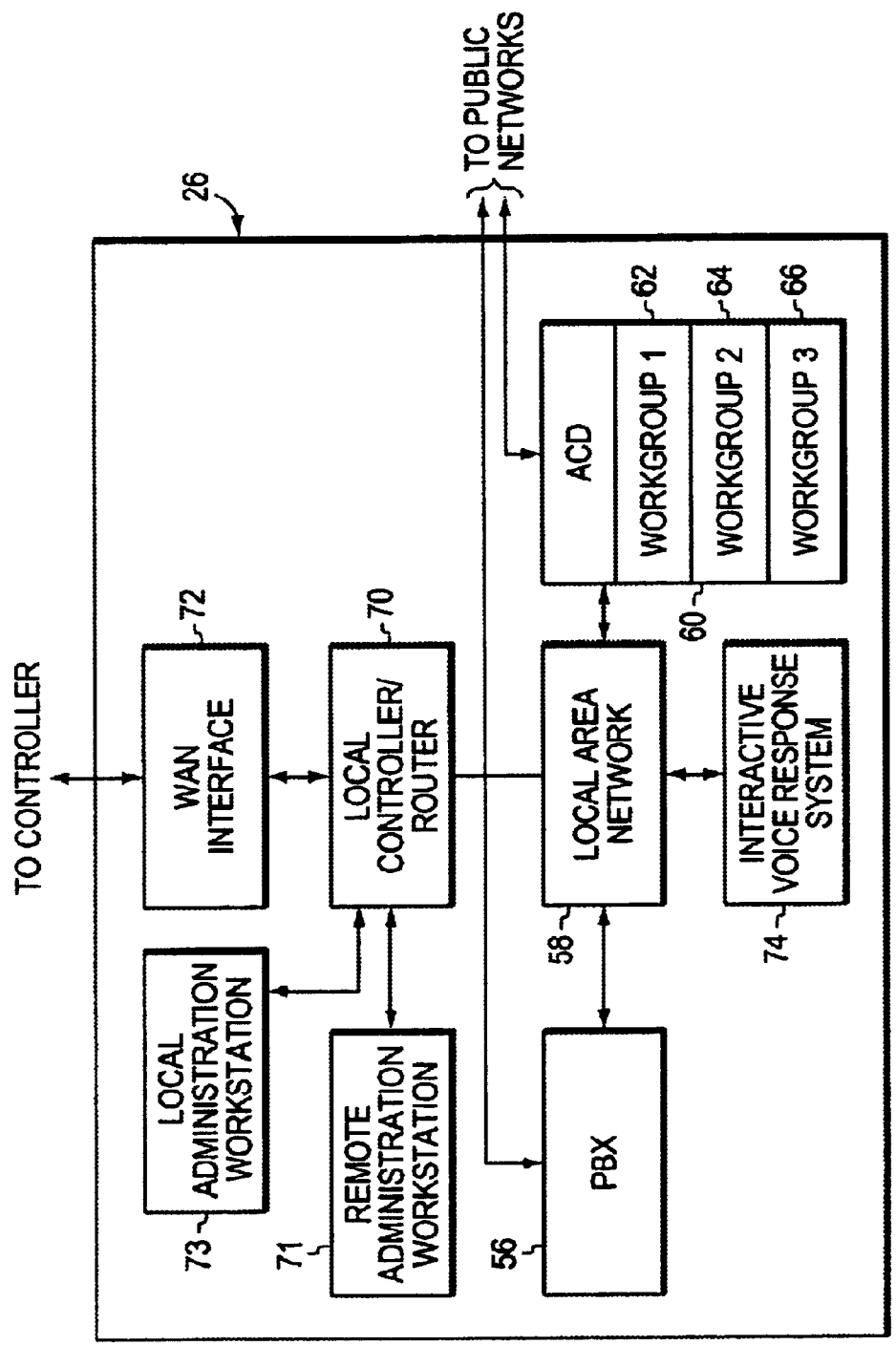
FIG. 3 is a functional block diagram of one type of agent system that may be used in the system of FIG. 1.

FIG. 3 is a functional block diagram of one type of agent system that may be used in the system of FIG. 1. Agent system 26 comprises an interface 72 for interfacing the agent system's local controller/router 70 to the controller's wide area network interface 44, so as to permit transfer of command and other messages from controller 30 to local controller 70 and status and other messages from the local controller 70 to controller 30. In response to command and other messages received by local router 70 from controller 30, local router 70 issues commands to the ACD/IVR, or PBX system causing public network interfaces (not shown) in the ACD, PBX or IVR to connect and disconnect calls received threat from the public networks to and from appropriate caller services (e.g. interactive voice response system 74) or individual agents (e.g. connected to private branch exchange (PBX) 56 or ACD 60). It should be noted that the particular type and number of caller services and agent workgroups shown in FIG. 3 are merely for illustrative purposes and may vary. Local router 70 issues commands via the conventional local network 58 to the caller service or individual agent system in the workgroup to which the call is connected, as to how the individual agent or caller service is to distribute or process the call. For example, depending upon the command messages transmitted by the controller 30 to controller 70, controller 70 may instruct the call to be forwarded directly to the interactive voice response system 74 which is connected as an answering resource to ACD 60, and instruct the interactive voice response system to store information from the call for later retrieval and transmission to a workstation (not shown) connected to the PBX 56, or to connect the call to the ACD 60 and instruct the ACD to forward the call to one of its workgroups 62, 64, 66. Of course, it will be appreciated that if appropriately modified, the network interfaces may be comprised within the public networks or may comprise separate, stand-alone interfaces distinct from the agent systems. Likewise, if the PBX, IVR, and/or ACD are appropriately modified so as to include other of the various functional components of the agents (e.g. router 70), they may be eliminated, or comprised as separate functional components from the agent system. Local controller 70 also queries the individual agents and caller services for status information (e.g. whether they are active or busy, what resources are available for use by callers, etc.), gathers this status information via the local network 58, and transmits this information to the central controller 30 via interface 72 for use in the central controller's routing decisions.

Agent system 26 may also comprise local administration workstation 73 for permitting user control of the local router 70, and remote administration workstation 71 for permitting remote control of central controller 30. Both administration workstations 73, 71 are of similar construction to administration workstation 32. Local administration workstation 73 may be limited in its ability to control local router 70 (i.e., only to control matters not being controlled by central controller 30). Likewise, remote administration workstation 71 may be limited in its authority over system 10 such that administration workstation 32 may override commands issued by administration workstation 71.

Figure 4:
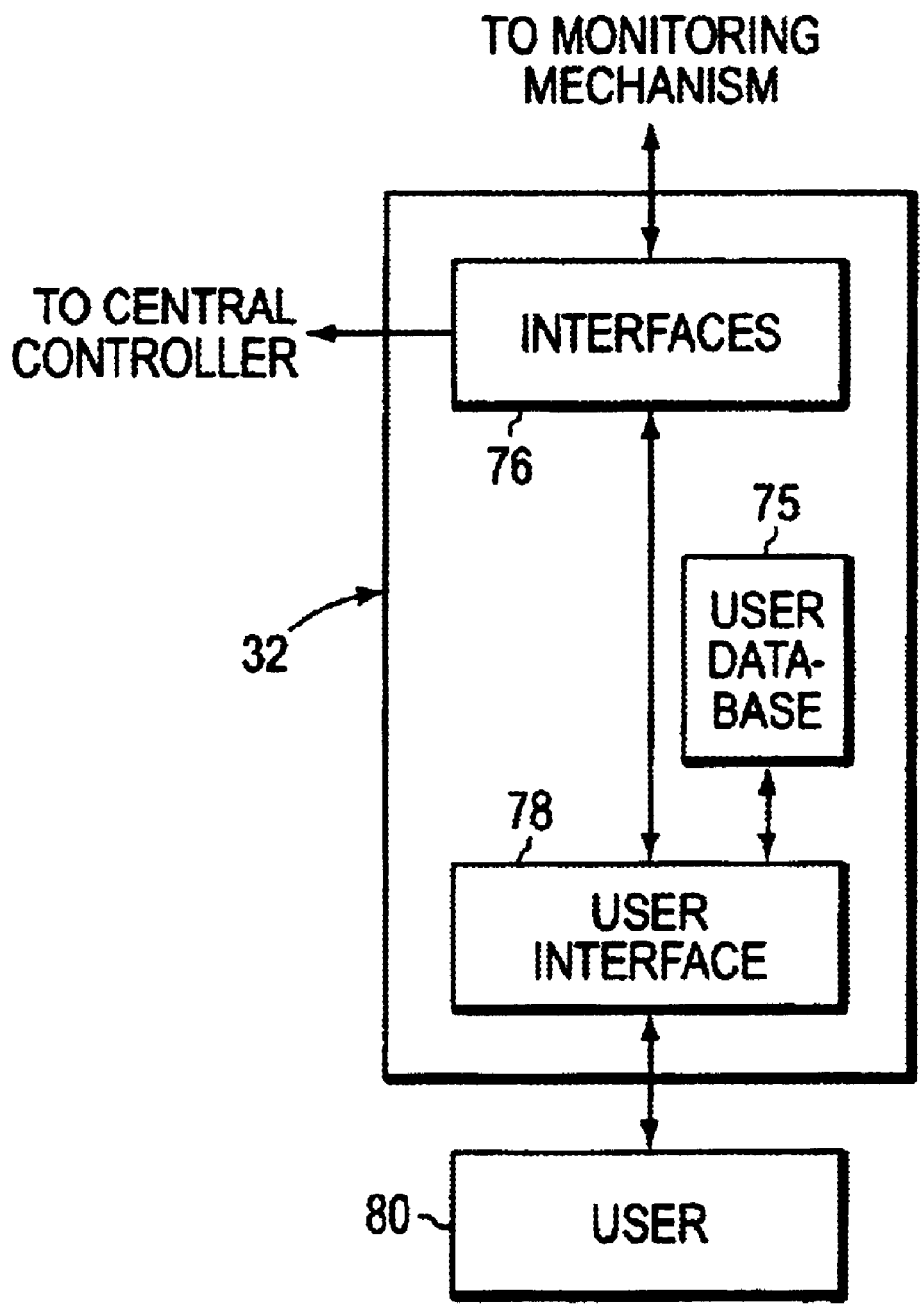
FIG. 4 is a functional block diagram of an administrative workstation used in the system of FIG. 1.

FIG. 4 is a functional block diagram of administration workstation 32. Workstation 32 may comprise a user input/ output interface 78 connected to central controller interface 76. User interface 78 may comprise a graphical user interface for permitting a human user 80 to generate, edit, and store call control routing scripts 200, system configuration data 202, global dialed number plan translation table 206, etc. in the database 54 of the central controller 30. The database interface 76 is adapted to change the user's graphically input data into a form usable by the central controller in the central controller's database 54. Administration workstation 32 comprises a user-accessible database 75 for storing real-time information and configuration information and for permitting such information to be communicated to a human user via the user interface 78. Also, administration workstation 32 permits a user to monitor various system activities and current system information, such as, call routing, system configuration, etc.

Figure 6:
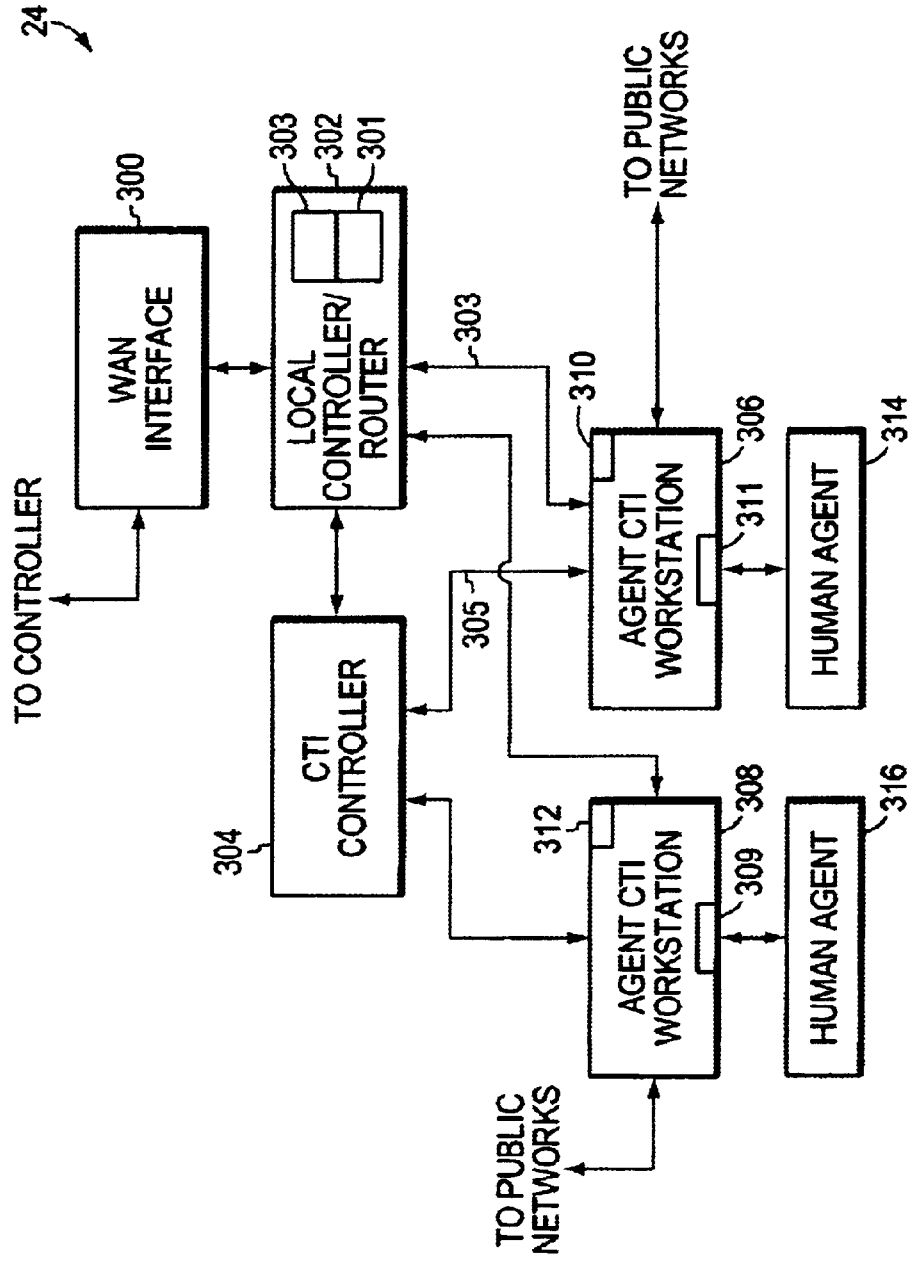
FIG. 6 is a functional block diagram of another type of agent system that may be used in the system of FIG. 1.

FIG. 6 is a functional block diagram of another type of agent system 24 that may be used in system 10. In contrast to the agent system 26 whose construction is illustrated in FIG. 3, the agent system 24 does not include an ACD system. Instead, as will be described more fully below, agent system 24 comprises, among other things, a plurality of computer program processes executing in a plurality of computer nodes that operate in a such a way as to permit agent system 24 to exhibit certain ACD-like functionalities. As is shown in FIG. 6, non-ACD agent system 24 comprises a wide area network interface 300 for interfacing the local controller/router 302 of the agent system 24 to the wide area network interface 44 of the central controller 30, so as to permit transfer of command and other messages from controller 30 to local controller 302 and status and other messages (including CTI event status messages) from the local controller 302 to controller 30. In response to command and other messages received by local controller 302 from the central controller 30, local controller 302 issues commands and data to the CTI controller 304, and also issues commands to the agent CTI workstations 306, 308.

More specifically, each workstation 306, 308 comprises respective telephony-related hardware and executing software processes (e.g., based upon the Telephony Application Program Interface of Microsoft Corporation of Redmond, Wash.) that permit the workstations 306, 308 to receive and process incoming calls from, and to establish outgoing calls to, the networks 12, 14, 16. By controlling the hardware and software processes, controller 302 is able to control the telephony operations of the workstations 306, 308, including answering and termination of incoming calls, and establishment and termination of outgoing calls. The telephony hardware may also include conventional mechanisms (e.g., comprising respective agent telephone headsets and mouthpieces) for permitting the agents 314, 316 to communicate with the callers involved in such incoming and outgoing calls, and conventional mechanisms for providing physical connectivity to the networks 12, 14, 16 (e.g., comprising respective Music Telecom 1×1™ telephony device cards 310, 312).

The commands and data issued by the controller 302 to the controller 304 may 10 control the provision of, among other things, agent status and call processing-related information from the controller 304 to application processes (not shown) executing in the individual workstations 306, 308. For example, based upon commands and data that it receives from the local controller 302, CTI controller 304 may gather information related to the processing of calls by, and the current status of, the workstations 306, 308 and is agent system 24, and may provide that information to these application processes, and to the controller 302. Such information may include, e.g., whether a particular agent workstation is busy (i.e., actively "off-hook" and connected to a call), waiting to receive a call, connected to an as yet unanswered call, available to receive a call, etc. These application programs may then use computer/user interfaces 311, 309 to display this information in a 20 form that is understandable by human agents 314, 316, respectively, so as to permit the a g e n t s 314, 316 to be able to monitor the processing of calls by their respective workstations 306, 308 and by the system 24. These application program processes and interfaces 311, 309 also provide a mechanism by which agents 314, 316 may request the establishment of outbound calls from the agent system 24 via one or more of the networks 12, 14, 16, using an embodiment of the technique of the present invention, and may request changes in respective statuses of the workstations 306, 308 (e.g., the agents 314, 316 may request the termination of particular calls received or initiated by the workstations).

Controller 304 may also provide, based upon commands and data received from the controller 302, call context information concerning particular calls received by the workstations. The contents of such call context information may vary, and for example, may include ANI-related information, digits entered or dialed by the caller placing the call, customer account number and/or other information related to previous business transactions made by the caller, and/or other call-identification-related information. The call context information may be initially gathered by, and forwarded to, the controller 302 by the controller 30.

Figure 8:
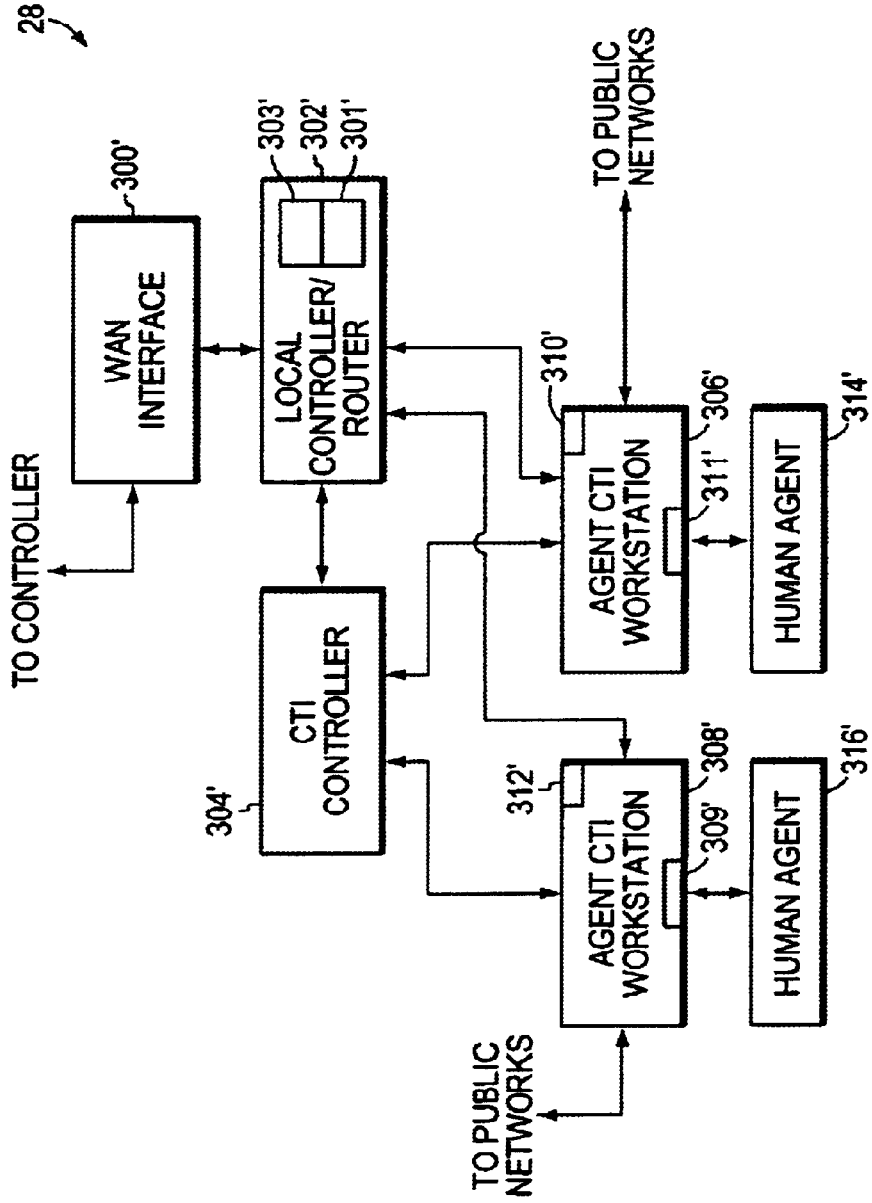
FIG. 8 is a functional block diagram illustrating the construction of another agent system of the type shown in FIG. 6.

As shown in FIG. 8, agent system 28 may have the same construction as agent system 24. The primed elements of system 28 have the same or similar functionality and operation as the corresponding unprimed elements of system 24.

The above-presented functional components (with the exception of public networks 12, 14, and 16 and PBX 56 and ACD system 60 of agent system 26) of system 10 may be embodied as, or comprise one or more distributed computer program processes executing in a plurality of computer nodes; each of these nodes may include computer-readable memory for storing software programs, algorithms, and data structures associated with, and for carrying out, the inventive techniques, and related and other techniques and methods described herein as being carried out by or implemented in system 10. In addition, each of these nodes may further include a processor (e.g., an Intel 80×86 processor) for executing these software programs and algorithms, and for manipulating the stored data structures, to enable the nodes to carry out these methods and techniques in system 10. Additionally, the nodes may be provisioned with such networking hardware and software (e.g., including computer networking and telephonic communications hardware and software) as is needed to enable performance of the stated functionality.

It should be noted that the functional components of the system 10 may vary depending upon particular functional and operational requirements. For example, the existing components of system 10 may be modified to incorporate the functionality of, or the system 10 may be modified to include, fault-tolerance-related functional components (e.g., a redundant central controller), components related to processing of Internet calls, and/or call-queuing-related components described in the aforesaid Andrews et al. patent (i.e., U.S. Pat. No. 5,873,130). Accordingly, it should be appreciated that the present invention may be practiced in systems other than system 10 (e.g., in systems having different and/or additional functional components like those described in the aforesaid Andrews et al. patent, and other communications systems).

With reference now being made to FIGS. 1–8, one embodiment of the call management technique of the present invention will be described. In use, in this embodiment of the present invention, each CTI agent workstation 306, 308 that is comprised in an agent system of the type illustrated in FIG. 6 initially is in an off-line condition wherein 20 no active network sessions are established between the workstations and the CTI controller 304 or local controller 302 via which the controllers 302, 304 may issue CTI and telephony commands to the workstations that will be implemented by the workstations, or via which workstation call processing and call context-related information may be exchanged between the controller 304 and the workstations. In order for the workstations 306, 308 to enter an on-line condition wherein such active network sessions are established, each workstation 306, 308 must go through a respective log-in negotiation process to establish respective active network sessions. For purposes of clarity of description, the s log-in negotiation process that is undergone by workstation 306 will be described. However, it should be understood that, in order to go from an off-line condition to an on-line condition, each of the CTI agent workstations in an agent system of type illustrated in FIG. 6 must undergo an identical respective negotiation process.

The log-in negotiation process of workstation 306 commences with the generation and issuance by the workstation 306 of an initial log-in request that is forwarded to the CTI controller 304. The generation and issuance of the log-in request to the controller 304 may be initiated by the human agent 314 associated with the workstation 306 by activating Active-X log-in processes using the interface 311. A valid log-in request validly specifies (or contains) at least the following information: a unique alphanumeric identification string associated with the human agent 314 (hereinafter referred to as the "agent ID" of agent 314) and a password associated with the agent ID. The log-in request may optionally include an instrument identification string (hereinafter referred to as the "instrument ID"). The instrument ID essentially is a concatenation of respective values that together define the particular physical telephony device (e.g., the device 310 in workstation 306) in system 24 to and from which calls may be routed. These values are delimited by predetermined delimiting characters and may specify a directory number (which may, e.g., comprise or specify the telephone number of the workstation 306) associated with the workstation 306, a TAPI identification number associated with the device 310, and a physical TAPI address associated with the device 310.

A valid log-in request may also optionally specify additional information (hereinafter referred to as "device target information") that may further define the telephony device 310 associated with the agent 314 and the agent's workstation 306. The device target information may comprise or specify a system-wide unique logical name or handle of the device 310, an indication of the type of device being defined (e.g., whether the device is a voice telephony device), system-wide unique physical (e.g., medium access control) and/or logical (e.g., Internet protocol) addresses for the device 310, the time zone (specified in offset minutes from Greenwich Mean Time) within which the device 310 is operating, the number of telephone lines/channels managed by the device 310, and configuration parameters that associated with device 310 (e.g., TAPI line device address of device 310, dual tone multifrequency signals necessary to command device 310 to desired telephony operations, etc.).

After agent 314 activates the Active-X log-in processes, these processes prompt the agent 314 (via a log-in screen generated by interface 311) to enter the agent ID and password. The log-in screen may also permit the agent 314 to enter the instrument ID and device target information. Alternatively, the workstation 306 may be configured to automatically determine this information and provide to the log-in processes. After the agent 314 has entered the agent ID and password, and optionally, the instrument ID and device target information have been entered or provided to the processes, the agent 314 may command the log-in processes (via interface 311) to forward the log-in request to the CTI controller 304.

In response to these commands, the workstation 306 then forwards the log-in request with the agent-entered log-in information (i.e., the agent ID and password, and optionally, the instrument ID and device target information) to the CTI controller 304. After CTI controller 304 receives the log-in request and accompanying information, the controller 304 forwards them to the controller 302.

Controller 302 maintains one or more agent workstation configuration tables 301 wherein valid agent IDs and respective valid passwords are associated with previously-stored, respective instrument IDs (and the respective separate values comprising the respective instrument IDs) and device target information. The controller 302 may validate the log-in request by comparing the agent ID and password submitted with the log-in request for conformity with a valid agent ID and respective valid password stored in the tables 301. If the controller 302 finds that such conformity exists, and the log-in request contains instrument ID and/or device target information, the controller 302 determines that a valid log-in request has been made by the agent 314, and then updates the respective instrument ID (and respective separate values comprising the respective instrument IDs) and/or device target information associated with the agent-entered agent ID and password in the tables 301 to conform with the corresponding information contained in the log-in request. Alternatively, if the controller 302 finds that the agent ID and password submitted with the log-in request match an agent ID and associated password in the tables 301, but instrument ID and/or device target information was not submitted with the log-in request, the controller 302 determines that a valid log-in request has been made by the agent 314, but does not change the information contained in the tables 301.

Conversely, if the controller 302 finds that the agent ID and password submitted with the log-in request do not match a valid agent ID and associated password stored in the tables 301, the controller 302 may cause the controller 304 to issue commands to the workstation 306 that cause the interface 311 to indicate to the agent 314 that the log-in request has failed, and optionally, to request that the agent 314 resubmit a different agent ID and password pair.

After the controller 302 determines that a valid log-in request has been made by the workstation 306, the controller 302 issues commands to the controller 304 and workstation 306 to establish the necessary network session(s) that cause the workstation 306 to go into an on-line condition. The controller 302 then transmits to the routing engine 48 one or more messages that (1) inform the routing engine 48 that a valid log-in request has been made by the agent 314 and specify the agent ID of agent 314, (2) request that the engine 314 inform the controller 302 as to any workgroups to which the agent 314 may belong, (3) provide the routing engine 48 with any updated information (i.e., instrument ID (and respective separate values contained in the instrument ID) and/or device target information that was submitted with the log-in request), and (4) request that the engine 48 log-in the agent 314 to the system 10 as being in actively networked status (e.g., as being available to receive calls routed thereto by the engine 48, request establishment of outgoing call therefrom, etc.).

Figure 7:
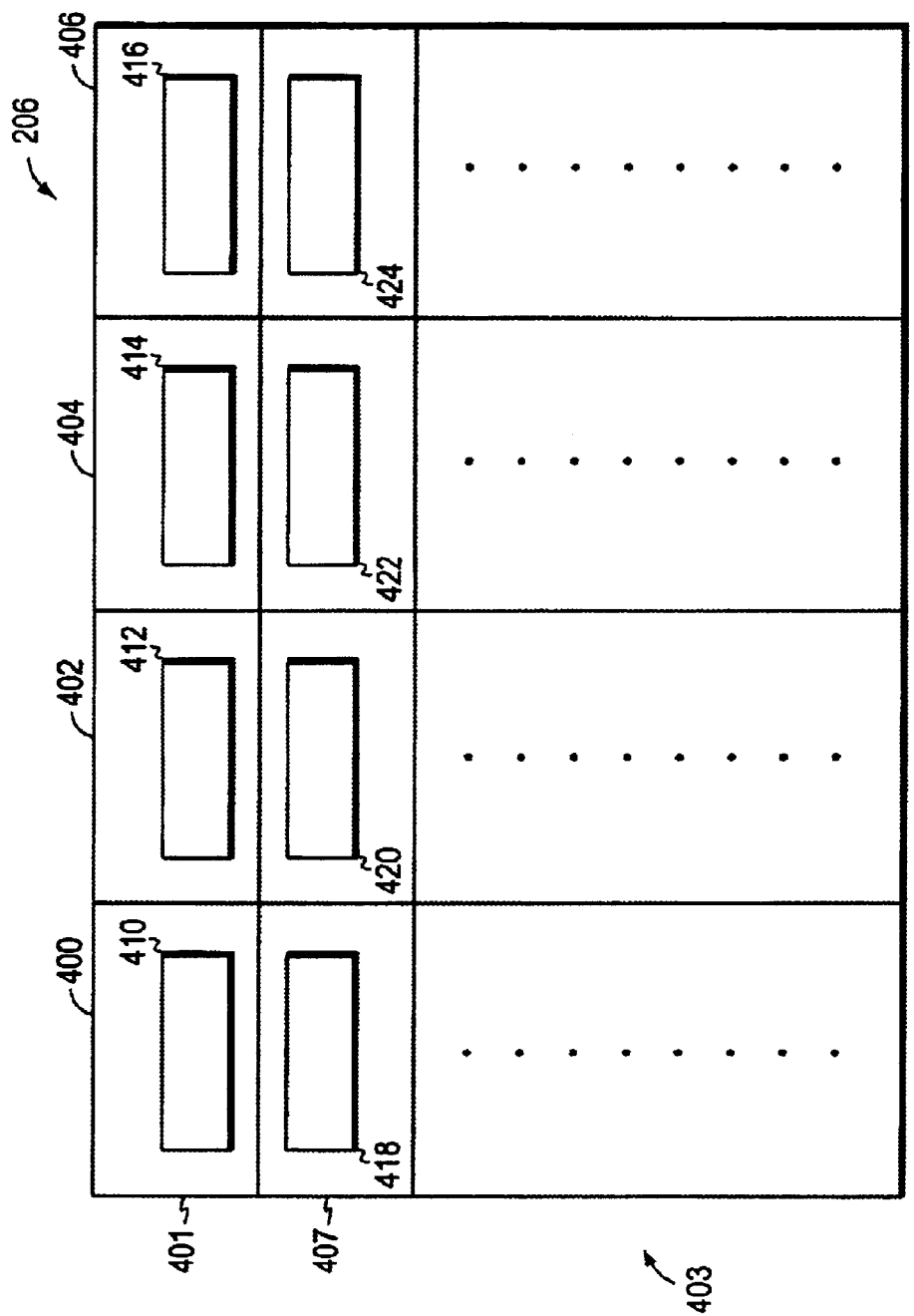
FIG. 7 symbolically illustrates information that may be contained in one of the data structures stored in the database shown in FIG. 5.

Routing engine 48 maintains at least one global dialed number translation table 206. As shown in FIG. 7, table 206 includes a plurality tuples 403; in each of the tuples 403, a respective agent's agent ID information 400 is associated with the respective agent's instrument ID (and respective values comprised therein) and device target information 402, a listing 404 of the workgroups to which the respective agent belongs, and a respective label 406 of the respective agent. For example, in tuple 401, the agent ID 410 of agent 314 is associated with the instrument ID (and respective values comprised therein) and device target information 412 of agent 314, a listing 414 of the workgroups to which agent 314 belongs, and a label 416 of the device 310 in the workstation 306 with which agent 314 is associated.

Similarly, in tuple 407, the agent ID 418 of agent 316 is associated with the instrument ID (and respective values comprised therein) and device target information 420 of agent 316, a listing 422 of the workgroups to which agent 316 belongs, and a label 424 of the device 312 in the workstation 308 with which agent 316 is associated. It should be understood that although not shown in FIG. 7, respective tuples exist in the table 206 wherein the respective agent IDs of agents 314', 316' are associated with respective instrument ID (and respective values comprised therein) and respective device target information of the agents 314', 316', respective listings of the workgroups to which the agents 314', 316' belong, and respective labels of the devices 310', is 312'.

When engine 48 receives the one more messages from controller 302, the engine 48 accesses the information in the table 206 and determines based upon the agent ID 410 supplied in the messages, which workgroups the agent 314 is associated. The engine 48 also updates the other information 412, 414, 416 in the table 206 (and also in the configuration data 202) to conform with any updated information (i.e., instrument ID (and respective separate values contained in the instrument ID) and/or device target information) provided in the messages. After performing these actions, the engine 48 updates the configuration data 202 to indicate that the agent 314 is now in an actively networked status. The engine 48 issues to the controller 302 one or more messages that indicate to the controller 302 the workgroups to which the agent 314 belongs and that the agent 314 has been logged into the system 10 in an actively networked status.

After the controller 302 receives the indication from the engine 48 that the agent 314 has been logged into the system 10 in an actively networked status, the controller 302 transmits one or more messages to the controller 304 that indicate that agent 314 has been logged into the system 10. In response to these messages, the controller 304 completes the log-in negotiation process by providing messages to the workstation 306 that indicate that the agent 314 and workstation 306 are now logged-in.

In use, in system 10, when an agent (e.g., agent 314') in one agent system (e.g., agent system 28) wishes to place an outbound call to another agent (e.g., agent 314) in another agent system (e.g., agent system 24), the agent 314' may enter appropriate commands via the application programs and user interface 311' of the agent's associated workstation 306' that cause the workstation 306' to issue to the controller 304' an out bound call request (OCR). In accordance with this embodiment of the present invention, instead of reciting or specifying the actual valid telephone number of the agent 314 that agent 314' desires to call, the OCR issued by the workstation 306' to the controller 304' may contain or specify the agent ID 410 of agent 314. When the CTI controller 304' receives the OCR from workstation 306', the controller 304' forwards it to the controller 302'.

When controller 302' receives the OCR forwarded from the controller 304', the controller 302' may first consult local DNPTT 303' to determine whether conventional conversion algorithms are specified in the local DNPTT 303' for the agent ID 410 of the workstation 306. In accordance with this embodiment of the present invention, the DNPTT 303' may also associate with each valid agent ID 400 in system 10 a respective logical variable (not shown) whose value may indicate whether the respective actual label of the agent 314 associated with the agent ID 410 is to be determined by the controller 302' using conventional dialed number plan conversion algorithms specified in the local DNPTT 303', or alternatively, is to be determined by the routing engine 48 using the global DNPTT 206. For purposes of this discussion, it is assumed that the value of the respective logical variable associated with the agent ID 410 indicates that the routing engine 48 is to determine the destination label of the agent 314 associated with the agent ID 410 using the global DNPTT 206; after the controller 302' determines that the value of this respective logical variable indicates that the engine 48 is to make this determination, the controller 302' issues to the engine 48 a call routing request (CRR) that includes the agent ID 410 and requests that the engine 48 provide the controller 302' with the destination label associated with the agent 314 whose agent ID 410 is included in the CRR. Conversely, if the value of this respective logical variable does not indicate that the engine 48 is to make this determination, the controller 302' may make said determination based upon conventional dial plan conversion algorithms specified in the local table 303' and may cause the telephony device 310' to call the agent 314 (e.g., via one 12 of the networks 12, 14, 16) using the thus determined destination label of the agent 314.

Routing engine 48 associates a respective predetermined subset of call control script instructions 200 with each respective valid agent ID for which the engine 48 can be requested to select a respective destination label. These respective subsets of instructions 200, when executed by the engine 48, cause the engine 48 to determine and apply respective conversion algorithms to the respective agent IDs to determine destination labels that may be used to establish calls to agents associated with the agent IDs.

When the routing engine 48 receives the CRR, the engine 48 executes, in response to the received CRR, the respective predetermined subset of control script instructions 200 that is associated with the agent ID 410. This subset of instructions 200, when executed, determines and applies to the agent ID 410 conversion algorithms that result in the determination of a destination label that is to be used by the agent system 28 to establish the requested outgoing call to the agent 314. For example, when executed, the subset of instructions 200 associated with the agent ID 410 may cause the engine 48 to determine, based upon real-time status messages received from the agent system 24, the information in the DNPTT 206, and real-time configuration data 202, whether the agent 314 presently is available to receive and answer a call placed to agent 314, and if the agent 314 is unavailable to receive and answer the call, to select another agent (e.g., agent 316), in the same workgroup as the agent 314, who presently is available to receive and answer such is a call. The subset of instructions 200 may then cause the engine 48 to select, based upon the information in the table 206, from among the destination labels (e.g., labels 416, 424) of the telephony devices 310, 312 associated with the agents 314, 316 in the same workgroup, respectively, a destination label 424 associated with the selected available agent 316. Alternatively, upon determining that the agent 314 is unavailable, the engine 48 may wait a predetermined period of time, or until the agent 314 becomes available, to continue execution of the subset of instructions 200.

Conversely, if the agent 314 is presently available to receive and answer the call, the executed subset of instructions 200 may cause the engine 48 to select, based upon the information in the table 206, a destination label 416 associated with the agent 314.

Alternatively, the agent ID provided in the OCR (and forwarded to the engine 48 by the controller 302' in the CRR) need not be associated with an actual agent, but instead, may be associated with a group of agents (e.g., an agent workgroup/skillgroup). In such a situation, the subset of control script instructions 200 executed by the engine 48 may cause the engine 48 to select from the table 206 the tuples (e.g., tuples 401, 402) whose workgroup entries (e.g., entries 414, 422) correspond to the group associated with the provided agent ID. The executed subset of instructions may then cause the engine 48 to selected, based upon the information in the selected tuples 401, 402, real-time status messages from the agent systems, and configuration data 202, an "optimal" agent (e.g., agent 314) to which the requested outgoing call should be established. The "optimal" agent may be, e.g., the longest available agent in the agent group associated with the provided agent ID. The executed subset of instructions may then cause the engine 48 to select the destination label 416 of this "optimal" agent 314 from the table 206.

Further alternatively, if appropriately modified, instead of being used by a human agent, one or more of the workstations (e.g., workstation 316) may be used as a caller service provider (e.g., a VRU system). In such an alternate arrangement, the agent ID provided in the OCR (and forwarded to the engine 48 by the controller 302' in the CRR) need not be associated with an actual agent, but instead, may be associated with a group of such caller service providers. In such a situation, the subset of control script instructions 200 executed by the engine 48 may cause the engine 48 to select from the table 206 the tuples (not shown) of caller service providers comprised in that group. The executed subset of instructions may then cause the engine 48 to select, based upon the information in the selected tuples, real-time status messages from the agent systems, and configuration data 202, an "optimal" caller service provider to which the requested outgoing call should be established. The "optimal" caller service provider may be, e.g., the longest available caller service provider in the caller service provider group associated with the provided agent ID. The executed subset of instructions may then cause the engine 48 to select a destination label of this "optimal" caller service provider from the table 206.

Once the engine 48 has selected a destination label (e.g., label 416) in response to receipt of the CRR, the engine 48 transmits to the controller 302' a reply to the CRR that specifies the selected destination label 416. Optionally, prior to transmitting the reply to the controller 302', the engine 48 may evaluate, using conventional outgoing call permission techniques, whether the agent 314' that initially requested the outgoing call is authorized to place a call to the selected label. The engine 48 may make this evaluation based upon outgoing call agent permission level entries (not shown) that may be preconfigured in the table 206. These entries may associate outgoing call permission levels with respective agent IDs so as to enable the engine 48 to determine whether the agent 314' requesting the outgoing call is authorized to request that type of outgoing call (e.g., an international long distance, national long distance, etc. call). If the engine 48 determines that the agent 314' requesting the outgoing call is not authorized to request the type of outgoing call being requested, the engine 48 may provide, instead of a reply specifying the destination label 416, a message to the controller 302' that indicates that the CRR is invalid; the controller 302' may then provide to the workstation 314' a message that indicates that the engine 48 has rejected the CRR and the agent 314' is not authorized to request that type of outgoing call.

When the controller 302' receives the reply specifying the destination label 416, the controller 302' causes the device 310' to place a call via one 12 of the networks 12, 14, 16 to the destination (i.e., device 310) addressed by the destination label 416. Contemporaneously, the engine 48 may cause the controller 302 of the system 24 to command the device 310 and workstation 306 to receive and process the call when it arrives at the device 310'.

It should be understood that above-described embodiments are being presented herein as examples and that many variations and alternatives thereof are possible. For example, if appropriately modified, the workstations and calling devices may be provided with appropriate mechanisms for establishing an IP telephony call via one or more of the networks 12, 14, 16 and/or via the same data network that is used to provide control and data messages between the workstations, CTI controller, and the local controller of the is non-ACD agent systems, and the central controller. In order to facilitate the ability to establish IP telephony calls, instead of comprising Music 1x1™ cards, the telephony devices 310, 312, 310', 312' may comprise Windows 2000™ h323 client TAPI service provider processes/devices, or other voice-over-IP (VOIP) related processors/devices, such as those that use or are based upon session initiation protocol (SIP). Accordingly, the present invention should be viewed broadly as being defined only as set forth in the hereinafter appended claims.

What is claimed is:

1. A call management method implemented using a call routing engine, the method comprising:

receiving at the engine a call management request from a first device that the engine provide the first device with a destination label of a second device that is desired to be called by the first device via a network, the second device being identified in the request by a first value; and determining at the engine the label based, at least in part, upon information correlating the label, the first value and a second value associated with the second device, at least the label and the second value being associated with the second device by the engine during a log-in negotiation involving the engine and the second device.

2. A method according to claim 1, wherein the label is a telephone number associated with the second device.

3. A method according to claim 1, wherein at least one of the first and second devices is an agent system.

4. A method according to claim 1, wherein first value specifies one of an agent workgroup and a voice response unit (VRU) that comprises the second device.

5. A method according to claim 1, wherein the engine associates the second device with the first value during the negotiation.

6. A method according to claim 1, wherein the first value and the second value are provided to the engine during the negotiation.

7. A method according to claim 6, wherein the label is selected by the engine from a plurality of destination labels of respective devices in a device classification specified by the first value.

8. A method according to claim 1, wherein the network comprises one of a public network and a private network.

9. A call management system comprising:

means for receiving at a call routing engine a call management request from a first device that the engine provide the first device with a destination label of a second device that is desired to be called by the first device via a network, the second device being identified in the request by a first value; and means for determining at the engine, in response to the request, the label based, at least in part, upon information correlating the label, the first value and a second value associated with the second device, at least the label and the second value being associated with the second device by the engine during a log-in negotiation involving the engine and the second device.

10. A system according to claim 9, wherein the label is a telephone number associated with the second device.

11. A system according to claim 9, wherein at least one of the first and second devices is an agent system.

12. A system according to claim 9, wherein the first value specifies one of an agent workgroup and a voice response unit (VRU) that comprises the second device.

13. A system according to claim 9, wherein the engine associates the second device with the first value during the negotiation.

14. A system according to claim 9, wherein the first value and the second value are provided to the engine during the negotiation.

15. A system according to claim 14, wherein the label is selected by the engine from a plurality of destination labels of respective devices in a device classification specified by the first value.

16. A system according to claim 9, wherein the network comprises one of a public network and a private network.

17. A call management apparatus comprising:
a call routing engine that receives a call management request from a first device that the engine provide the first device with a destination label of a second device that is desired to be called by the first device via a network, the second device being identified in the request by a first value; and
the engine determining, in response to the request, the label based, at least in part, upon information correlating the label, the first value and a second value associated with the second device, at least the label and the second value being associated with the second device by the engine during a log-in negotiation involving the engine and the second device.

18. An apparatus according to claim 17, wherein the label is a telephone number associated with the second device.

19. An apparatus according to claim 17, wherein at least one of the first and second devices is an agent system.

20. An apparatus according to claim 17, wherein first value specifies one of an agent workgroup and a voice response unit (VRU) that comprises the second device.

21. An apparatus according to claim 17, wherein first value specifies one of an agent workgroup and a voice response unit (VRU) that comprises the second device.

22. An apparatus according to claim 17, wherein the first value and the second value are provided to the engine during the negotiation.

23. An apparatus according to claim 22, wherein the label is selected by the engine from a plurality of destination labels of respective devices in a device classification specified by the first value.

24. An apparatus according to claim 17, wherein the network comprises one of a public network and a private network.

25. Computer-readable memory comprising computer-executable instructions that, when executed, cause:
receiving at a call routing engine of a call management request from a first device that the engine provide the first device with a destination label of a second device that is to be called by the first device via a network, the second device being identified in the request by a first value; and
determining at the engine of the label based, at least in part, upon information correlating the label, the first value and a second value associated with the second device, at least the label and the second value being associated with the second device by the engine during a log-in negotiation involving the engine and the second device.

26. Memory according to claim 25, wherein the label is a telephone number associated with the second device.

27. Memory according to claim 25, wherein at least one of the first and second devices is an agent system.

28. Memory according to claim 25, wherein the first value specifies one of an agent workgroup and a voice response unit (VRU) that comprises the second device.

29. Memory according to claim 25, wherein the engine associates the second device with the first value during the negotiation.

30. Memory according to claim 25, wherein the first value and the second value are provided to the engine during the negotiation.

31. Memory according to claim 30, wherein the label is selected by the engine from a plurality of destination labels of respective devices in a device classification specified by the first value.

32. Memory according to claim 25, wherein the network comprises one of a public network and a private network.

33. A method according to claim 1, wherein in response to the request the engine determines whether a call placed to the second device from the first device is permitted, prior to providing the label to the first device.

34. A system according to claim 9, wherein in response to the request the engine determines whether a call placed to the second device from the first device is permitted, prior to providing the label to the first device.

35. An apparatus according to claim 17, wherein in response to the request the engine determines whether a call placed to the second device from the first device is permitted, prior to providing the label to the first device.

36. Memory according to claim 25, wherein the instructions also cause, in response to the request, the engine to determine whether a call placed to the second device from the first device is permitted, prior to providing the label to the first device.

37. A method according to claim 1, wherein the network is an Internet Protocol network and the first and second devices are configured to establish an Internet Protocol call via the network.

38. A system according to claim 9, wherein the network is an Internet Protocol network and the first and second devices are configured to establish an Internet Protocol call via the network.

39. An apparatus according to claim 17, wherein the network is an Internet Protocol network and the first and second devices are configured to establish an Internet Protocol call via the network.

40. Memory according to claim 25, wherein the network is an Internet Protocol network and the first and second devices are configured to establish an Internet Protocol call via the network.

* * * * *